US005252273A

United States Patent [19]

Sakai et al.

[11] Patent Number: 5,252,273

[45] Date of Patent: Oct. 12, 1993

[54] SLIP CASTING METHOD

[75] Inventors: Junji Sakai, Ibaraki; Masahisa Sobue, Mito; Yoshiyuki Yasutomi, Katsuta, all of Japan

[73] Assignee: Hitachi, Ltd., Tokyo, Japan

[21] Appl. No.: 704,925

[22] Filed: May 23, 1991

[30] Foreign Application Priority Data

May 30, 1990 [JP] Japan ........ 2-138223

[51] Int. Cl.[5] ........ B28B 1/26; B28B 7/20; B29C 33/40; B29C 33/76

[52] U.S. Cl. ........ 264/86; 264/221; 264/225; 264/317; 264/318; 264/334; 264/336; 264/337

[58] Field of Search ........ 264/86, 87, 337, 338, 264/313, 318, 317, 316, 71, 334, 333, 219, 225–227, 220, 221, 336

[56] References Cited

U.S. PATENT DOCUMENTS

| | | | |
|---|---|---|---|
| 2,893,062 | 7/1959 | Penrice | 264/219 X |
| 3,823,023 | 7/1974 | Duggins et al. | 264/338 X |
| 3,888,662 | 6/1975 | Boeckler | 264/337 X |
| 4,312,821 | 1/1982 | Jarcho et al. | 264/333 X |
| 4,556,528 | 12/1985 | Gersch et al. | 264/221 |
| 4,659,526 | 4/1987 | Shimaguchi et al. | 264/317 X |
| 4,808,360 | 2/1989 | Natori et al. | 264/221 |
| 4,812,278 | 3/1989 | Natori et al. | 264/86 X |
| 4,871,497 | 10/1989 | Natori et al. | 264/317 X |
| 4,883,621 | 11/1989 | Natori et al. | 264/86 |
| 4,931,242 | 6/1990 | Uchimura et al. | 264/87 |
| 4,976,903 | 12/1990 | Matsuhisa et al. | 264/86 |
| 4,996,024 | 2/1991 | Nishio et al. | 264/86 X |
| 5,013,500 | 5/1991 | Hamanaka et al. | 264/86 X |

FOREIGN PATENT DOCUMENTS

| | | | |
|---|---|---|---|
| 294596 | 12/1988 | European Pat. Off. | 264/219 |
| 1199903 | 9/1986 | Japan | 264/337 |
| 1258707 | 11/1986 | Japan | 264/317 |
| 1-160619 | 6/1989 | Japan | 264/317 |

*Primary Examiner*—Karen Aftergut

*Attorney, Agent, or Firm*—Antonelli, Terry, Stout & Kraus

[57] ABSTRACT

A casting method for manufacturing various types of ceramics products having an intricate configuration and a partly diversified wall thickness, such as compressor scroll blade and a screw rotor, by casting a slurry including ceramics, etc. in a mold, includes an arrangement wherein the mold is partly or entirely formed of a flexible gel material which can be melted by heating at a temperature lower than the boiling point of the dispersion medium, whereby the stresses generated when molding the product can be mitigated. Thus, the molding of a product having a high level of dimensional accuracy can be carried out with ease.

14 Claims, 7 Drawing Sheets

SLIP CASTING METHOD

BACKGROUND OF THE INVENTION

This invention relates to a method of manufacturing various products by casting a slurry containing ceramics, metals, carbons, etc. in a mold and, in particular, to a method suitable for manufacturing products having an intricate configuration with a diversified wall thickness, such as a compressor scroll blade and a screw rotor.

Among the methods of molding various materials into products is slip casting, wherein the material powder is dispersed in a disperse medium (such as water or alcohol) to prepare a fluid slurry, which is poured into a mold to obtain a molded object. A lot of products are being manufactured by this molding method.

Usually, a gypsum mold is used in slip casting. However, when molding an object having an intricate configuration, such as a turbocharger rotor, a screw rotor, or a scroll blade, defects such as cracks are likely to be involved during the molding, so that, with a gypsum mold alone, it is difficult to mold such an intricate product. In view of this, the molding of a product with an intricate configuration by slip casting has conventionally been carried out by using, in combination, a gypsum mold and a mold which can be removed after the casting in the gypsum mold. The removable mold used may consist of a resin mold made of a thermoplastic or a thermosetting resin, a wax mold, or a rubber mold. Such a removable mold is integrated with the gypsum mold by adhesion, fitting, etc.

Molding methods of this type are disclosed, for example, in Japanese Patent Unexamined Publication Nos. 56-28687, 59-120405, 59-190811, 60-253505, 63-288703, etc.

In the method described in Japanese Unexamined Publication No. 63-288703, a polyethylene glycol, which is among polyalkylene glycols, is adopted as the material of the removable mold, which is melted and removed when releasing the molded object from the mold.

The properties of a polyethylene glycol, however, vary depending upon its molecular weight. For example, a low-molecular-weight polyethylene glycol has a molecular structure akin to that of alcohol and melts when absorbing water, etc., so that it cannot serve as the material of a core. On the other hand, a mold made of a high-molecular-weight polyethylene glycol exhibits flexibility in those sections thereof where it is in contact with the slurry. However, due to its large molecular weight, the flexibility resulting from its coming into contact with the slurry is far from satisfactory. Thus, when used as the material of a core, such a high-molecular-weight polyethylene glycol is not much different from a hard material except for those portions thereof constituting the core surface. Accordingly, it is not capable of absorbing the stresses generated when the mold absorbs dispersion medium to cause the molded object to shrink, with the result that cracks are generated in that process.

A problem in slip casting is that, if, when forming a green body (a molded object) by pouring slurry into a mold entirely consisting of gypsum, at least a part of the green body has a configuration which is liable to be restrained by the mold, the stresses that are generated as the green body shrinks cannot be mitigated, with the result that cracks are generated in the green body.

This is the same in the case where a resin mold and a gypsum mold are used in combination if the green body has any restrained portion, which will cause cracks to be generated therein when it is dried. Further, when removing the resin mold by heating, deformation of the molded object or generation of cracks therein may occur due to the thermal expansion of the resin.

This also applies to the case where a wax mold and a gypsum mold are used in combination. In this case, the crack generation and deformation are due to the poor flexibility of the wax mold or the gypsum mold. When using these two types of molds in combination, the operation of removing the removable mold by heating must be performed while maintaining a highly moist condition (which prevents the green body from drying). However, when decomposed by the high temperature when heating, the wax may soak into the green body, with the result that a large amount of carbons remains inside the green body. If calcining is carried out in that condition, the sintered body will be deformed, or the strength thereof is diminished.

Unlike the case where a resin mold or a wax mold is used, a combination of a rubber mold and a gypsum mold has an advantage that, due to the flexibility of rubber itself, crack generation may be avoided even if there exists a green body portion restrained by the mold. However, since the removal of the rubber mold is usually effected by burning it out at a temperature ranging from 450° to 500° C., this combination is not suitable for a case where the slurry contains a substance which is incompatible with oxidation, such as silicon carbide or silicon nitride. In addition, when removing the rubber mold by burning, the rubber mold may expand and deform, thereby causing crack generation and deformation in the molded object. Further, the heating temperature when removing the rubber mold is in excess of the boiling point of the dispersion medium, so that, when removing the rubber mold, it is necessary to dry the molded object to a sufficient degree so as to remove the dispersion medium therefrom, thereby avoiding generation of defects in the molded object due to boiling of the dispersion medium. However, such sound drying increases the shrinkage amount of the molded object, so that cracks may be generated due to the shrinkage of the molded object.

Further, in all the above-described cases, the mold is prepared by a very complicated method. The resin mold is prepared by injection molding using a metal mold, and the wax mold is prepared by the lost-wax process, wherein a model of the product to be obtained is prepared by injection molding using a water-soluble wax; the surface of this model is coated with a non-water-soluble wax, and the water-soluble wax is removed by dissolving it in water so as to obtain the wax model. When preparing the rubber mold, the material is subjected to maturing and hardening for a long period after being poured into a metal mold. Afterwards, the material is released from the metal mold.

All of these types of molds require a complicated preparation process, resulting in a high cost. It should also be noted that they are consumable goods.

Accordingly, there has been a request in slip casting that the mold for obtaining a product having an intricate configuration be prepared with ease, and that no cracks or deformation be generated in the molded object.

SUMMARY OF THE INVENTION

The present invention has been made with a view to solving the above problems It is accordingly an object of this invention to provide a slip casting method which makes it possible to carry out the molding with ease and to obtain a molded object having a high level of dimensional accuracy.

The above problems can be solved by using the slip casting method of this invention.

Basically, the manufacturing method of this invention consists in forming a part or all of the mold of a flexible gel material which can be melted by heating at a temperature lower than the boiling point of the dispersion medium, pouring a slurry containing ceramics, metals, carbons, etc., casting into this mold and consolidating the slurry to obtain a molded object, which is dried and sintered.

Since the mold has flexibility and is removable by melting with heat, the molded object is not liable to involve defects when released from the mold. Further, since the mold can be melted at a temperature lower than the boiling point of the dispersion medium, generation of defects due to abrupt vaporization of any remaining dispersion medium in the molded object can be avoided.

In view of this, a flexible gel material is only used in the surface portion of the mold where the portion is in contact with slurry, with the remaining portion thereof being formed of a more rigid material, whereby not only can crack generation in the molded object be avoided but also the molding can be effectively carried out with a high level of dimensional accuracy.

Further, if the flexible gel material can be dissolved in water, an organic solvent or a solvent consisting of a mixture thereof, the releasing from the green body can be performed with ease, whereby generation of cracks or deformation in the molded object can be avoided and the molding can be performed with a high level of surface precision.

Further, when a flexible gel material containing bubbles is used, the mold exhibits a higher level of compressibility or flexibility. Further, a flexible gel material absorbent to dispersion medium may be used for casting, or a flexible gel material non-absorbent thereto may be adopted to avoid dehydration of the slurry. These measures will help to obtain a more desirable effect in terms of the configuration of the molded object.

Examples of the flexible gel material include gelatin, hemicellulose, a polyalkylene glycol, such as polyethylene glycol, which is made generally flexible by previous absorption of water, etc. Further, these materials may include bubbles.

Of course it is possible for the mold to partly consist of gypsum. If used with a mold which is made of a highly compressible or flexible gel material, a gypsum mold section will help to obtain molded objects of various configurations.

Further, by using a flexible gel material which is hard to compress, compressive deformation of the mold when molding under pressure can be avoided, thereby making it possible to obtain a molded object with a high level of dimensional accuracy.

By using a flexible gel material which is easy to compress, any restraining force in the molded object can be still further diminished.

The flexible gel material may contain insoluble particles or fibers. However, it is more desirable for the material not to contain such particles or fibers, for, when heated or dissolved in a solvent, a flexible gel material containing no such particles or fibers liquefies to allow the mold to be removed through the pores in the molded object.

By being sintered, the molded object obtained becomes a sintered product having no defects. The material dispersed in the slurry may be ceramics, metals, carbons, etc., which are used unitarily or in the form of a mixture of two or more types of them. The material may be in the form of particles, fibers, whiskers, etc. While the molded object is formed of materials as mentioned above, it is possible to obtain a sintered product formed of a material different from that of the molded object through reaction between the materials of the molded object or reaction between them and an atmospheric substance.

In a mold in accordance with this invention, the intricate sections thereof which will constitute restraining sections are formed of a flexible gel material which melts when heated at a temperature lower than the boiling point of the dispersion medium, so that the mold absorbs any strain when the molded object solidifies and contracts after the casting of the slurry. Accordingly, no cracks are generated in the molded object.

In a manufacturing method using a mold in accordance with this invention, the mold need not be removed by heating at high temperature after the casting of the slurry, as in the case of a conventional mold such as a resin mold, a wax mold, and a rubber mold, and, since the mold can be removed with ease at a temperature lower than the boiling point of the dispersion medium, no cracks are generated in the molded object.

Further, since it melts easily, the mold of this invention can be removed with ease through pores in the molded form too, thus making it possible to mold a hollow product.

In addition, the mold of this invention can be prepared at low cost with high precision and high efficiency. Further, it is more economical in that it allows recovery.

Due to the effects described above, the present invention can be effectively applied to the manufacture of casings and rotors for turbochargers, various types of impellers, rotors for screw-type fluid machines, scroll blades and Oldham's rings for scroll-type fluid machines, ceramic molds for investment casting, commutators, carriage parts and guide rails for magnetic disc devices, elliptic gears for flow meters, hollow products such as hollow balls, various types of nozzles, hollow cylindrical products, fluted products, and other types of intricately shaped, hollow parts for machines and structures.

The solute of the slurry may be in the form of particles, fibers, whiskers, etc. The solute material may be selected from ceramics, metals, carbons, etc., so that it is possible to mold objects of a variety of materials.

It is effective to form the mold of this invention of a flexible gel material having a Young's modulus lower than that of the molded object since it will help to avoid generation of cracks in the drying process. Further, this flexible gel material is particularly effective when used as the material for the mold which is to be positioned inside the molded object when this dries and contracts.

As described above, in this invention, generation of cracks can be avoided even when the molded object has intricately shaped sections which constitute restraining sections. Further, since it can be easily released from the mold, the molded object has a smooth surface and a high level of dimensional accuracy. Accordingly, the molded object suffers little deformation when dried and sintered, so that a sintered object having a high level of dimensional accuracy can be obtained.

DESCRIPTION OF THE PREFERRED EMBODIMENTS

The present invention will now be described with reference to embodiments thereof, which, however, should not be construed as restrictive.

First Embodiment

Figure 1A:
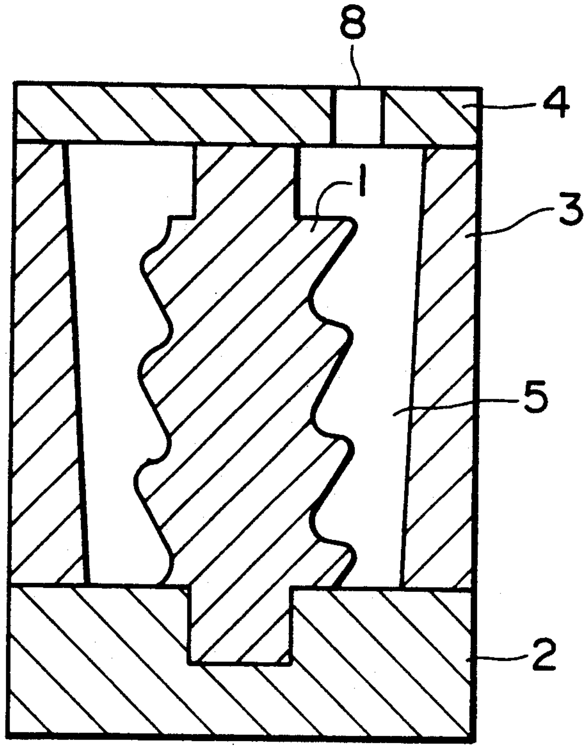
FIGS. 1*a* and 1*b* are schematic view showing a mold preparation process in accordance with the first embodiment.
Figure 1B:
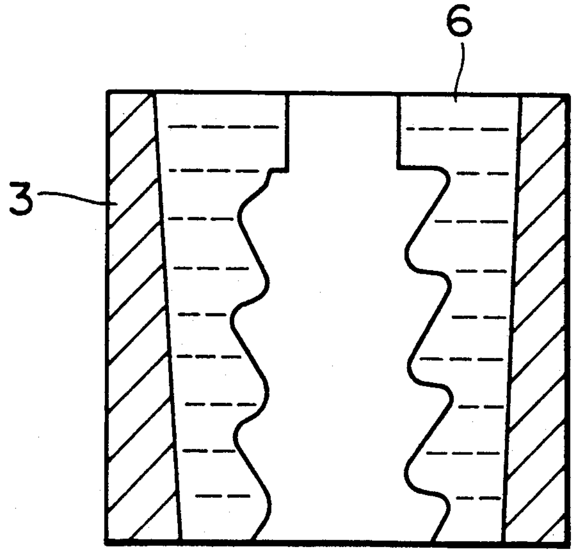
Figure 2:
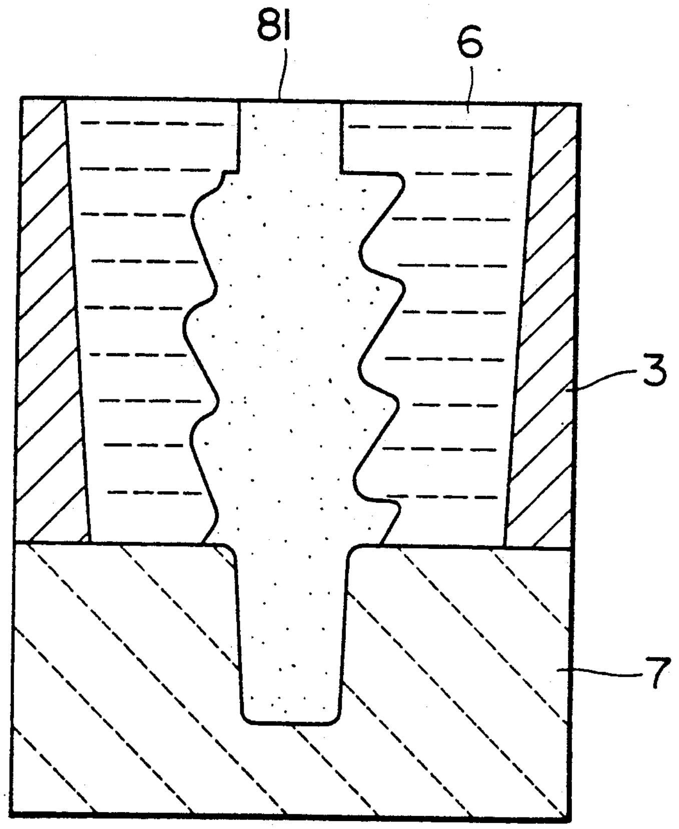
FIG. 2 is a schematic view showing a production method in accordance with the first embodiment wherein a ceramics screw rotor is produced.

An embodiment of this invention which is applied to the manufacture of a compressor screw rotor will be described. FIGS. 1*a* and 1*b* are schematic diagrams illustrating a process in the preparation of a mold in accordance with this invention; and FIG. 2 is a schematic diagram illustrating a process in the manufacture of a compressor screw rotor wherein the mold of this invention is used.

First, the master pattern of the screw section (having five blades), constituting the intricately shaped section of the screw rotor to be manufactured, was formed by machining, obtaining a metal pattern 1.

As shown in FIG. 1*a*, this pattern 1 was secured at a predetermined position on a stationary platen 2, and a material prepared beforehand was poured into a molding space 5 defined by setting in position a frame 3 and a cover 4, through an inlet 8 provided in the cover 4. The material used consisted of a fluid solution obtained by adding 500 ml of warm water (50° C.) to 100 g of a gelatin on the market and stirring it well. Subsequently, the entire mold was kept in a refrigerator and was cooled down to 10° C. to solidify the solution to gel. Then, the stationary platen 2 and the cover 4 were removed and the metal pattern 1 was released from the mold by rotating it in the torsional direction while supplying compressed air to the interface between the metal pattern 1 and the solidified gel substance. Then, as shown in FIG. 1*b*, a gelatin mold 6 including a screw-section space was obtained. Afterwards, the mold was kept in the refrigerator.

A gypsum mold 7 for forming the shaft section of the screw rotor was prepared as follows: gypsum in limited amounts was added to a solution consisting of 100 parts by weight of a calcined gypsum on the market and 80 parts by weight of water, and, by stirring the mixture quietly, a slurry was obtained. Subsequently, the slurry was poured into a wood pattern previously prepared, and, after the setting and solidification of the slurry, the pattern was removed. Afterwards, the solidified slurry was subjected to a heating process of 50° C. ×72H in a dryer, and was then cooled down to room temperature. By combining the gelatin mold 6 and the gypsum mold 7 with each other, a screw rotor mold as shown in FIG. 2 could be obtained.

The ceramics slurry was prepared by the following composition: 240 g of metal silicon powder having an average grain size of 0.9 μm; 60 g of silicon carbide powder having an average grain size of 0.6 μm; 120 ml of distilled water as the dispersion medium; and 0.39 g of naphthalenesulfonic acid sodium salt as the deflocculant. These materials were put in a resin pot and were mixed with each other in a ball mill for 50 hours. Afterwards, the slurry was subjected to a degassing process for 2 minutes in a decompression chamber, thereby removing the air in the slurry.

In molding, the mold was filled with slurry, which was poured through the slurry inlet 81 provided in the upper section of the mold. Since the gelatin pattern 6 is nonabsorbent, the water in the slurry is absorbed by the gypsum mold 7, thereby gradually forming a green body. Meanwhile, the supply of slurry was continued in consecutive stages. After the completion of the formation of the green body, the frame 3 is removed, and the mold is put in a constant temperature bath of 50° C., where the gelatin pattern 6 was melted and removed from the green body. Finally, the gypsum mold 7 was removed to obtain a molded object.

For comparison, separately prepared at the same time in addition to the gelatin pattern 6 were a metal mold, a resin mold, a wax mold, a rubber mold, and a water-absorption-disintegrable mold. Because of their poor flexibility, the metal mold, the resin mold, and the wax mold involved generation of cracks due to the contraction of the molded object during the drying process for dehydration after the completion of the green body formation. The rubber mold did not involve any crack generation during molding. However, with the rubber mold, release was difficult to perform; when forced to be released, the molded object suffered damage. The waterabsorption-disintegrable mold, a mold with an aggregate binder meltable when absorbing water, allowed, because of its absorbent property, green body formation to occur also on the surface thereof, with the result that cavity defects were generated in the central section of the molded object. Furthermore, it took much time to remove the mold material after release. In addition, the aggregate particles were liable to adhere to the surface of the molded object, so that the mold was softened and deteriorated in strength at the time of molding, resulting in the dimensional accuracy of the molded object being degenerated.

Next, to completely remove water from the molded object, the following process was performed: The molded object was allowed to stand in a constant temperature chamber (with a temperature of 20° C. and a humidity of 50 to 60%) for 70 hours, and was then subjected to heating processes of 60° C. ×5 h and 100° C. ×5 h in a drying furnace. Afterwards, the molded object was sintered. The sintering was performed in a sintering furnace with a 0.88 MPa nitrogen gas atmosphere under the conditions of 1100° C. ×20 h, 1200° C. ×20 h, 1300° C. ×10 h, and 1350° C. ×20 h. Afterwards, the molded object was cooled. The heating rate for each of the above temperatures was 5° C./min. The resulting molded object did not involve any generation of cracks or deformation and exhibited a high level of dimensional and surface precision. In this way, a screw rotor made of $Si_3N_4$-bonded SiC ceramics and having a relative density of 83% was obtained.

Second Embodiment

Figure 3A:
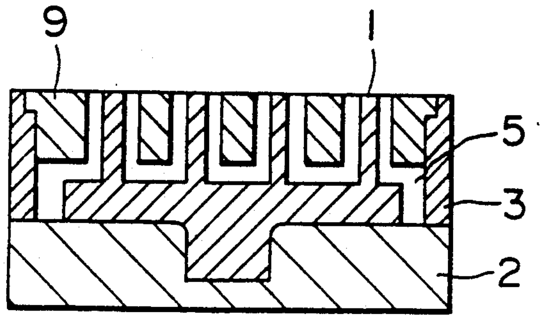
FIGS. 3*a* and 3*b* are schematic views showing a mold preparation process in accordance with the second embodiment.
Figure 3B:
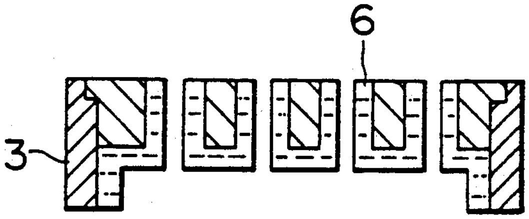

An embodiment applied to the manufacture of a compressor scroll blade will be described. FIGS. 3*a* and 3*b* are schematic diagrams showing a process in a mold preparation method; and FIGS. 4*a* and 4*b* are schematic diagrams showing a mold for a compressor scroll blade.

First, the master pattern of the scroll blade to be manufactured was prepared by machining. Thus, a metal pattern 1 was obtained, which was fixed, as shown in FIG. 3*a*, at a predetermined position on a stationary platen 2. Then, a frame 3 was set around the pattern 1, and a reinforcing core 9 was placed on the frame 3, thereby defining a molding space 5, into which was poured a material consisting of a solution obtained by heating 300 ml of a silicone on the market (white emulsion: Shin-etsu Kagaku) up to 50° C., adding 30 g of (granular) gelatin thereto, and stirring the mixture. Subsequently, the entire mold was put in a refrigerator and cooled down to 10° C. to solidify the solution to gel. Then, the stationary platen 2 was removed therefrom, and the remaining parts were immersed in water (10° C.), allowing water to get into the interface between the metal pattern 1 and the solidified gel substance so as to remove the metal pattern, thereby obtaining a gelatin pattern 6 including a scroll blade space as shown in FIG. 3*b*.

A mold containing a space for molding the shaft section was prepared in the same manner as in the first embodiment.

Figure 4A:
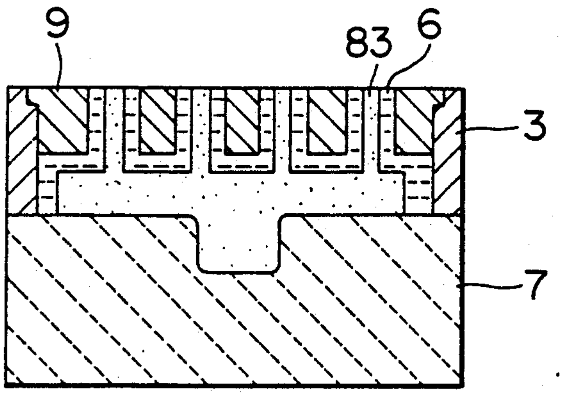
FIGS. 4*a* and 4*b* are schematic views showing a production method in accordance with the second embodiment wherein a ceramics scroll blade is produced.
Figure 4B:
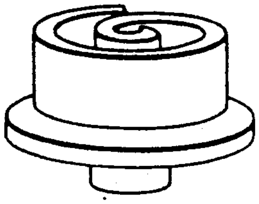

By containing the gelatin pattern 6 with the gypsum mold 7, a scroll blade mold as shown in FIG. 4*a* could be obtained.

The molding was performed by filling the mold with slurry, which was poured into it through a slurry inlet 83 provided in the upper section of the mold. The slurry was prepared in the same manner as in the first embodiment. The water in the slurry was absorbed by the gypsum mold, thereby causing a green body to be formed gradually. After completing the green body formation while continuing the slurry supply, the mold was put in a drying furnace warmed up to 50° C., thereby softening and melting the gelatin pattern 6 so as to allow it to flow out, thus removing it from the green body. Then, the reinforcing core 9 and the frame 3 were removed. Finally, the gypsum mold 7 was removed, thus obtaining a molded object.

Afterwards, the molded object was dried and sintered as in the first embodiment. Because of its flexibility and satisfactory releasability, the gelatin mold allowed no crack generation or deformation to occur in the molded object. In this way, a scroll blade made of $Si_3N_4$-bonded SiC ceramics and having a relative density of 83.5% was obtained, which consisted of a sintered form excelling in both dimensional and surface precision. (The perspective view of FIG. 4*b* schematically shows its configuration.).

By way of experiment, the size of the reinforcing core 9 was gradually made larger and the thickness of the gelatin mold 6 was accordingly reduced. At a certain thickness, cracks were generated in the molded object. This is because the mold had become incapable of absorbing the shrinkage of the molded object when dried. In such a case, a gelatin mold containing a multitude of bubbles exhibited a higher flexibility and easily allowed compression to decrease in volume, involving no crack generation in the molded object even when its thickness was made relatively small.

In another example, no reinforcing core 9 was used, forming the corresponding section of gelatin too. This made the mold flexible, so that no cracks were generated in the molded object. On the other hand, the rigidity of the mold was excessively small, with the result that the molded object deteriorated in dimensional accuracy. Thus, the mold of this invention allows itself to be modified in terms of its structure in accordance with the configuration, size and precision of the product to be obtained.

Third Embodiment

Next, an embodiment applied to the manufacture of an automobile turbocharger rotor will be described.

Figure 5A:
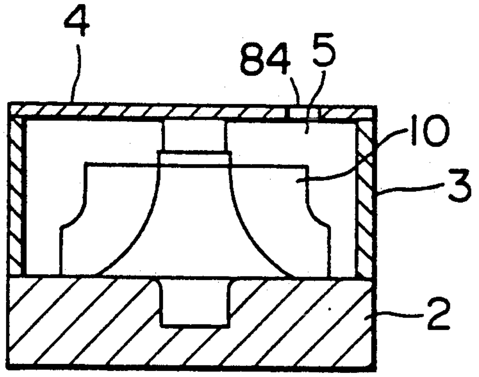
FIGS. 5*a* and 5*b* are schematic views showing a mold preparation process in accordance with the third embodiment.
Figure 5B:
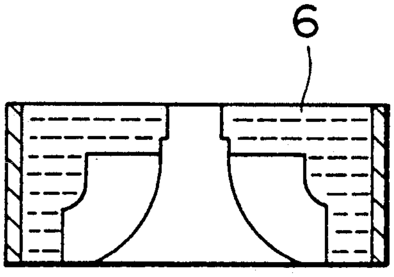
Figure 6:
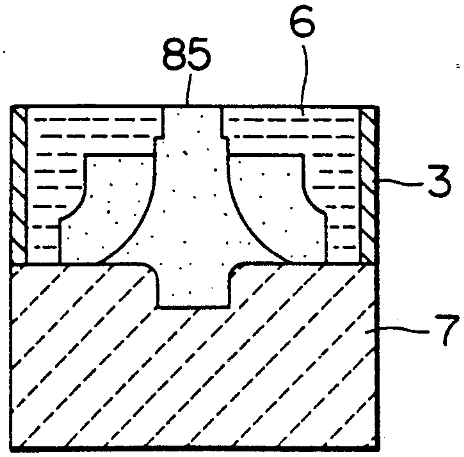
FIG. 6 is a schematic view showing a production method in accordance with the third embodiment wherein a ceramics turbocharger rotor is produced.

FIGS. 5*a* and 5*b* are schematic diagrams showing a process in a mold preparation method in accordance with this invention; and FIG. 6 is a schematic process drawing showing a process in a rotor manufacturing method using a mold in accordance with this invention.

First, the master pattern of the intricate section (having eleven blades) of the rotor to be manufactured was formed in a metal mold, and, by utilizing this metal mold, a silicon rubber blade was prepared, which was used as a rubber pattern.

As shown in FIG. 5*a*, this pattern was fixed at a predetermined position on a stationary platen 2. Then, a frame 3 and a cover 4 were set around the pattern to define a molding space 5, into which a molding material, prepared beforehand, was poured through a material inlet 84 provided in the cover 4, preparing a mold in the following sequence:

400 ml of warm water (50° C.) was added to 100 g of a gelatin on the market and stirred well to obtain a fluid solution. Subsequently, the entire mold containing this solution was kept in a refrigerator, where the solution was cooled down to 5° C. to solidify to gel. Afterwards, the stationary platen 2 and the cover 4 were removed, and the rubber pattern 10 was released while rotating it in the torsional direction of the blades. In this way, a gelatin pattern 6 containing a rotor space as shown in FIG. 5*b* was obtained.

A gypsum mold 7 including a molding space for the shaft section was prepared in the same manner as in the first embodiment.

By combining the gelatin pattern 6 with the gypsum mold 7, a rotor mold as shown in FIG. 6 could be obtained.

The ceramics slurry was prepared by the following composition:

(1) Material powder 85.5 wt% of silicon nitride powder ($Si_3N_4$ with an average grain size of 0.6 μm);

3.0 wt% of aluminum nitride (AlN with an average grain size of 1 μm);

6.0 wt% of yttrium oxide ($Y_2O_3$ with an average grain size of 0.5 μm); and 5.5 wt% of aluminum oxide ($Al_2O_3$ with an average grain size of 0.5 μm).

(2) Dispersion medium
Distilled water
(3) Deflocculant
Naphthalenesulfonic acid sodium salt.

120 ml of distilled water and 0.5 g of the deflocculant were added to 300 g of the material powder. The mixture was put in a resin pot along with resin balls and subjected to a ball milling process of 72 h, thereby obtaining a slurry, which was then allowed to stand three minutes in a decompression chamber so as to remove air therefrom. The above mold was filled with the slurry thus obtained by pouring it through an upper inlet 85 of the mold. The water in the slurry was absorbed by the gypsum mold 7, thereby gradually forming a green body. After the completion of the green body formation out of the slurry, the frame 3 was removed, and the mold was placed in a constant temperature bath heated to 40° C. so as to release it by dissolving the gelatin pattern 6. Afterwards, the gypsum mold 7 was removed, thus obtaining a molded object.

Subsequently, to remove water and deflocculant from it, the molded object was put in a drying furnace, where it was subjected to heating processes of 60° C. ×2 h and 100° C. ×5 h. Afterwards, the temperature was raised up to 500° C. and retained at this level for ten hours. Then, the molded object was cooled. Subsequently, the molded object was put in a sintering furnace, where it was sintered in a nitrogen gas atmosphere of 0.88 MPa, heating it under the conditions of 1600° C. ×2 h and 1750° C. ×5 h. Afterwards, the object was cooled. The increasing rate for each of the above temperatures was 10° C./min. After this process, the molded object exhibited no cracks or deformation. In this way, a turbocharger rotor made of $Si_3N_4$ -bonded SiC ceramics and having a relative density of 99.9% was obtained.

Fourth Embodiment

Next, to be described will be a case where a hollow ceramics sphere is produced.

Figure 7:
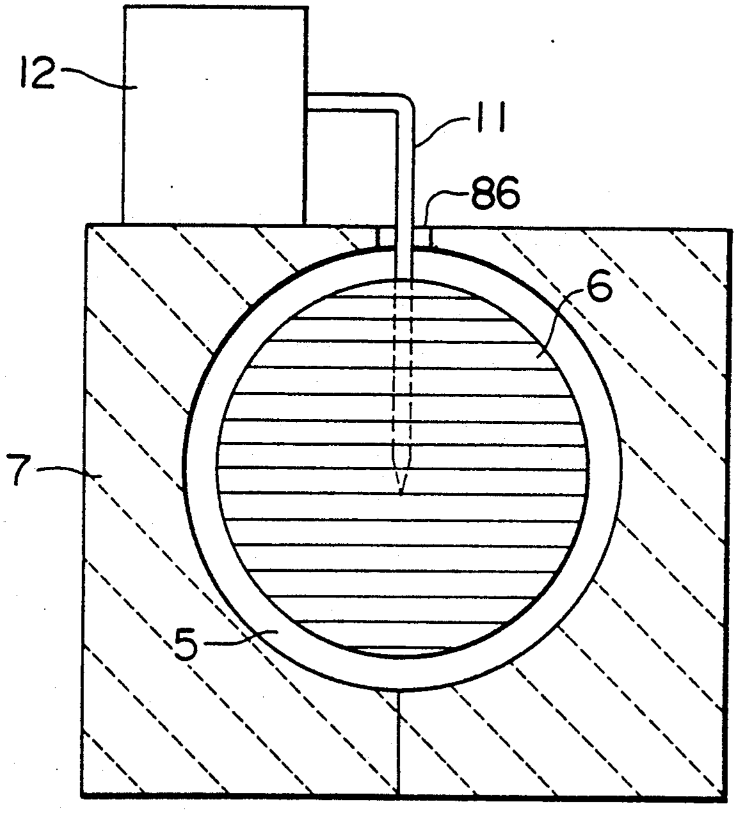
FIG. 7 is a schematic view showing a production method in accordance with the fourth embodiment wherein a hollow ceramics sphere is produced.

FIG. 7 is a schematic diagram showing a method of molding a hollow sphere by using a mold in accordance with this invention. In this embodiment, the structure of the gypsum mold 7 is such that it can be separated in the middle into two sections. The gelatin pattern 6 used consisted of a solid sphere, which was prepared out of a solution obtained by putting 100 g of a (granular) gelatin on the market in 300 ml of warm water (50° C). The solution was fluidized by adding thereto 0.2 ml of a surface-active agent (alpha-olefin-sulphonic acid sodium salt) and stirring the mixture by a high-speed mixer. Then, the solution was poured into a metal mold to be cast into a sphere containing bubbles. The gelatin mold 6 thus obtained is pierced with a fixed pin 11 which is fastened to a weight 12 by welding. A molding space 5 constituting the pattern of a hollow sphere is defined between the gelatin pattern 6 and the gypsum mold 7.

Slurry in limited amounts was poured into the gypsum mold through an inlet 86 thereof and along the fixed pin and the gelatin mold, thereby forming a green body layer from the bottom of the molding space 5 upwards while allowing the gypsum mold to absorb the dispersion medium. When the green body has grown up to a position near the inlet 86, the fixed pin 11 was drawn out of the gelatin pattern 6, and, by further pouring slurry into the gypsum mold, the green body layer was formed up to a position directly under the inlet 86. Allowed to stand one day in this condition, the green body section, for example, the molded object, shrank as a result of being dried. Since the gelatin mold was formed of a porous flexible material, it easily absorbed this shrinkage, so that no cracks were generated. Afterwards, the gypsum mold was removed and the remaining parts were heated in a dryer at 40° C., thereby melting the gelatin sphere and allowing it to flow out through the porous molded object. By sintering the molded object, a hollow ceramics sphere was obtained. The gelatin mold, the gypsum mold, and the slurry used in this embodiment were the same as those in the first embodiment.

When the wall thickness of the hollow sphere is small, cracks are likely to be generated in the molded object due to the expansion of the gelatin sphere and the bubbles contained therein when heating it in order to melt it. In such a case, it is advisable to melt the gelatin sphere by heating it in a heated-gas atmosphere. By doing so, the expansion pressure of the gelatin sphere is suppressed by the gas pressure of the atmosphere, thereby avoiding the generation of cracks.

Further, if the removal of the gelatin sphere cannot be effected sufficiently by heating alone, the molded object may be impregnated with a solvent for dissolving a compressible material like gelatin, for example, water, alcohol or acetone. This allows the gelatin sphere to be melted away effectively.

Fifth Embodiment

Another example of a method of producing a hollow ceramics sphere will be described.

Figure 8:
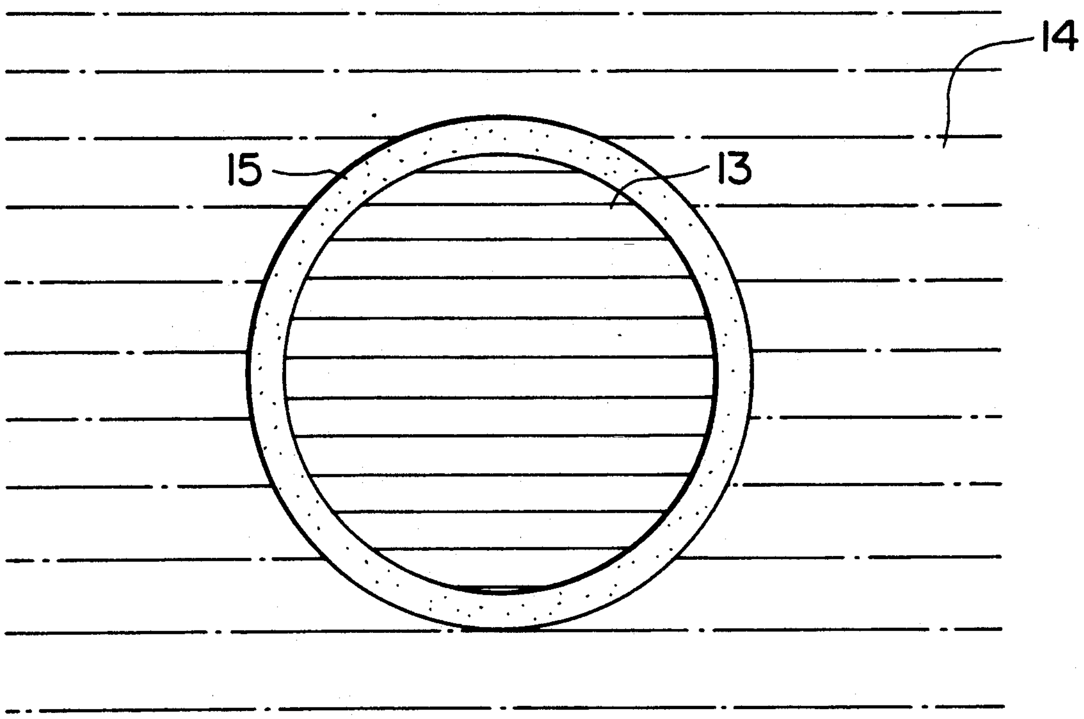
FIG. 8 is a schematic view showing a production method in accordance with the fifth embodiment wherein a hollow ceramics sphere is produced.

FIG. 8 is a schematic diagram showing a method for molding a hollow ceramics sphere. A spherical mold 13 which was absorbent to the dispersion medium, has prepared by putting 10 g of a (granular) gelatin on the market in 30 ml of warm water (50° C.), adding 8 g of a pulverized absorbent resin (Aqua Keep) to the solution thus obtained, cooling the mixture down to 20° C. to plasticize it, and pressure-forming this mixture in a metal mold. This mold was made of a flexible gel material allowing compression with ease and meltable at a temperature lower than the boiling point of the dispersion medium. When immersed in slurry 14, this dispersion-medium absorbent mold 13 absorbed dispersion medium from the slurry, whereby a green body layer 15 was formed on the surface of the mold 13. When the thickness of this layer had attained a certain level, the mold 13 was taken out of the slurry and dried. The green body layer shrank in this process. However, due to the high compressibility of the dispersion-medium-absorbent mold 13, no cracks were generated. Afterwards, as in the fourth embodiment, the dispersion-medium-absorbent mold 13 was removed, and the remaining object was sintered, thereby obtaining a hollow ceramics sphere.

The slurry used was the same as that in the first embodiment.

Sixth Embodiment

A description will be given of the production of a hollow cylindrical object by slip casting under pressure, which helps to reduce the molding time.

Figure 9:
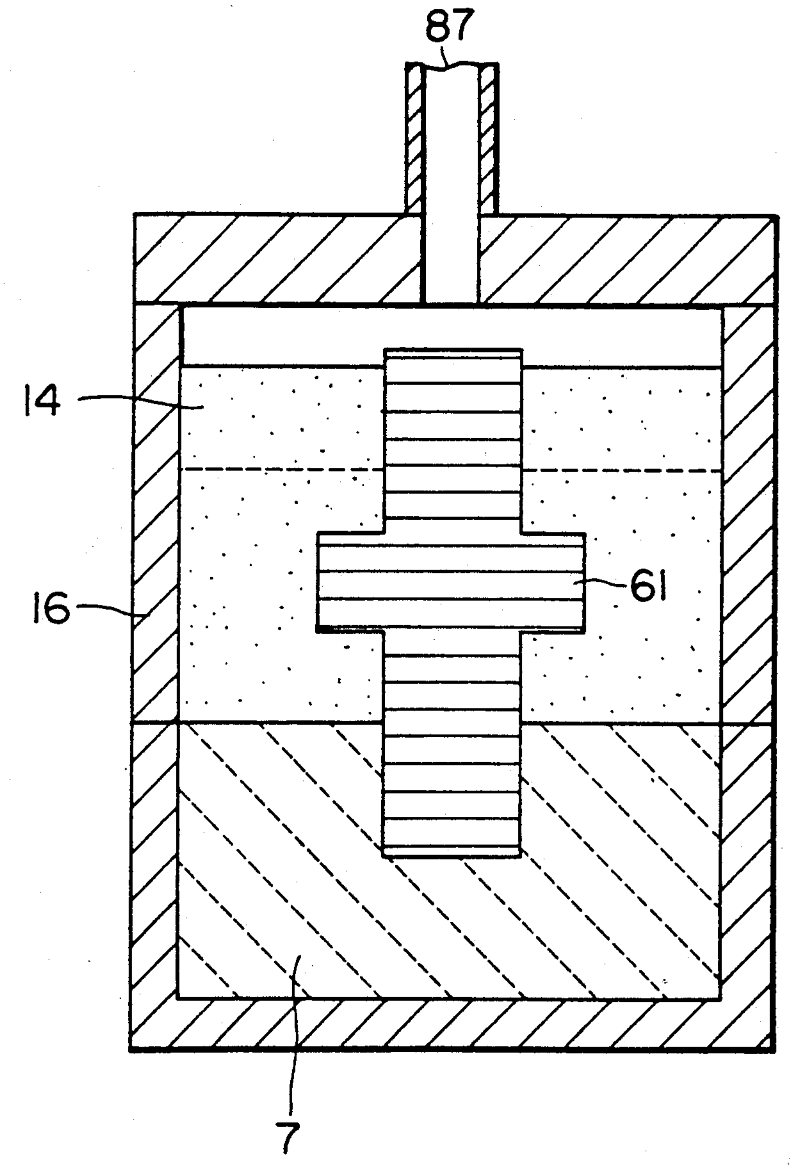
FIG. 9 is a schematic view showing a production method in accordance with the sixth embodiment wherein a hollow cylindrical object is produced.

FIG. 9 is a schematic diagram illustrating a molding method in accordance with this invention.

A gypsum mold 7 and a cylindrical said gelatin pattern 61, which was hard to compress were arranged inside a metal mold 16 capable of withstanding high pressure, in the manner shown in FIG. 9, and slurry 14 Was poured into this metal mold, through an inlet 87, up to the position indicated by the solid line. Afterwards, a gas pressure of 300 atm was applied through the inlet 87. Because of the low compressibility of the gelatin pattern 61, no deformation occurred when the pressure was applied. Thus, a molded object having predetermined inner and outer diameters was obtained. The height of the molded object is indicated by the broken line of 9.

The slurry and the gelatin mold use were the same as those in the first embodiment.

After the molding, the gelatin mold was removed by heating and melting it. Then, the remaining object was dried and sintered, thereby obtaining a hollow cylindrical ceramics product having no defect and exhibiting a high level of dimensional accuracy.

For comparison, a rubber mold was prepared and used instead of the gelatin mold. Because of its compressibility, the rubber mold suffered shrinkage when the pressure was applied, with the result that the accuracy in terms of configuration of the green body deteriorated. In addition, because of the expansion of the rubber mold, cracks were generated in the molded object.

What is claimed is:

1. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming a liquid when heated to a temperature lower than a boiling point of water;

cooling said poured solution to form said flexible compressible gel, said flexible compressible gel maintaining a desired shape in a slurry to be cast;

removing said metal pattern from said mold to form a flexible compressible pattern from said flexible compressible gel, said flexible compressible pattern defining a space in said mold;

setting said flexible compressible pattern on a liquid absorbing mold to from a composite mold;

pouring said slurry comprising ceramic particles dispersed in water into said space;

absorbing said water of said slurry into said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern from said green body by liquefying said flexible compressible pattern; and drying said green body from which said flexible compressible pattern has been removed to form said molded object with said high level of dimensional accuracy.

2. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming a liquid when heated to a temperature lower than a boiling point of a liquid in a slurry to be cast;

cooing said poured solution to form said flexible compressible gel, said flexible compressible gel maintaining a desired shape in said slurry to be cast, said flexible compressible gel forming an entire surface contacting said mold;

removing said pattern from said mold to form a flexible compressible pattern from said flexible compressible gel, said flexible compressible pattern defining a space in said mold;

setting said flexible compressible pattern on a liquid absorbing mold to form a composite mold;

pouring said slurry comprising ceramic particles dispersed in said liquid into said space;

absorbing said liquid of said slurry into said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern from said green body by liquefying said flexible compressible pattern; and drying said green body from which said flexible compressible pattern has been removed to form said molded object with said high level of dimensional accuracy.

3. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming a liquid when heated to a temperature lower than a boiling point of a liquid in a slurry to be cast;

cooling said poured solution to form said flexible compressible gel, said flexible compressible gel maintaining a desired shape in said slurry to be cast, said flexible compressible gel forming a portion of a surface contacting said mold;

removing said pattern from said mold to form a flexible compressible pattern from said flexible compressible gel, said flexible compressible pattern defining a space in said mold;

setting said flexible compressible pattern on a liquid absorbing mold to form a composite mold;

pouring said slurry comprising ceramic particles dispersed in said liquid into said space;

absorbing said liquid of said slurry into said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern from said green body by liquefying said flexible compressible pattern; and drying said green body from which said flexible compressible pattern has been removed to form said molded object with said high level of dimensional accuracy.

4. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming a liquid when heated to a temperature lower than a boiling point of a liquid dispersion medium of a slurry to be cast;

cooling said poured solution to form said flexible compressible gel, said flexible compressible gel maintaining a desired shape in said slurry to be cast, said flexible compressible gel forming an entire surface contacting said mold, said flexible compressible gel being adapted to absorb said liquid dispersion medium;

removing said metal pattern from said mold to form a flexible compressible pattern from said flexible compressible gel, said flexible compressible pattern defining a space in said mold;

setting said flexible compressible pattern on a liquid absorbing mold to form a composite mold;

pouring said slurry comprising ceramic particles dispersed in said liquid dispersion medium into said space, absorbing said liquid dispersion medium of said slurry into said flexible compressible pattern and said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern from said green body by liquefying said flexible compressible pattern; and drying said green body from which said flexible compressible pattern has been removed to form said molded object with said high level of dimensional accuracy.

5. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming a liquid when heated to a temperature lower than a boiling point of a liquid dispersion medium of a slurry to be cast;

cooling said poured solution to form said flexible compressible gel, said flexible compressible gel maintaining a desired shape in said slurry to be cast, said flexible compressible gel forming a portion of a surface contacting said mold, said flexible compressible gel adapted to absorb said liquid dispersion medium of said slurry to be cast;

removing said metal pattern from said mold to form a flexible compressible pattern from said flexible compressible gel, said flexible compressible pattern defining a space in said mold;

setting said flexible compressible pattern on a liquid absorbing mold to form a composite mold;

pouring said slurry comprising ceramic particles dispersed in said liquid dispersion medium into said space;

absorbing said liquid dispersion medium of said slurry into said flexible compressible pattern and said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern from said green body by liquefying said flexible compressible pattern; and drying said green body from which said flexible compressible pattern has been removed to form said molded object with said high level of dimensional accuracy.

6. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming liquid when heated to a temperature lower than a boiling point of a liquid dispersion medium in a slurry to be cast, cooling said poured solution to form said flexible compressible gel, said flexible compressible gel maintaining a desired shape in said slurry to be cast, said flexible compressible gel forming an entire surface contacting said mold, said flexible compressible gel being adapted to absorb said liquid dispersion medium of said slurry to be cast, said flexible compressible gel being removable by addition of a solvent;

removing said metal pattern from said mold to form a flexible compressible pattern from said flexible compressible gel, said flexible compressible pattern defining a space in said mold;

setting said flexible compressible pattern on a liquid absorbing mold to form a composite mold;

pouring said slurry comprising ceramic particles dispersed in said liquid dispersion medium into said space;

absorbing said liquid dispersion medium of said slurry into said flexible compressible pattern and said liquid absorbing mold of said composite mold until said slurry turns into a green body while said flexible compressible pattern maintains said desired shape, said flexible compressible pattern of said composite mold absorbing stresses caused by shrinkage by said green body during molding of said green body;

removing said flexible compressible pattern from said green body by liquefying said flexible compressible pattern by heating said flexible compressible pattern to melt said flexible compressible pattern, or by addition of a solvent to said flexible compressible pattern to dissolve said flexible compressible pattern; and drying said green body from which said flexible compressible pattern has been removed to form said molded object with said high level of dimensional accuracy.

7. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming liquid when heated to a temperature lower than a boiling point of a liquid dispersion medium of a slurry to be cast;

cooling said poured solution to form said flexible compressible gel, said flexible compressible gel maintaining a desired shape in said slurry to be cast, said flexible compressible gel forming a portion of a surface contacting said mold, said flexible compressible gel being adapted to absorb said liquid dispersion medium of said slurry to be cast, said flexible compressible gel being removable by addition of solvent;

removing said metal pattern from said mold to form a flexible compressible pattern from said flexible compressible gel, said flexible compressible pattern defining a space in said mold;

setting said flexible compressible pattern on a liquid absorbing mold to form a composite mold;

pouring said slurry comprising ceramic particles dispersed in said liquid dispersion medium into said space;

absorbing said liquid dispersion medium of said slurry into said flexible compressible pattern and said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern from said green body by liquefying said flexible compressible pattern; and drying said green body from which said flexible compressible pattern has been removed to form said molded object with said high level of dimensional accuracy.

8. A method of slip casting to form a molded object having a high level of dimensional accuracy, comprising the steps of:

setting a metal pattern in a mold;

pouring a solution of a flexible organic material into a cavity between said mold and said metal pattern, said solution gelling when cooled to form a flexible compressible gel and said gel becoming a liquid when heated to a temperature lower than a boiling point of a liquid dispersion medium of a slurry to be cast;

cooling said poured solution to form said flexible compressible gel, said flexible compressible gel maintaining a desired shape in said slurry to be cast, said flexible compressible gel forming an entire surface contacting into mold, said flexible gel being removable through holes in said molded object formed of said slurry;

removing said metal pattern from said mold to form a flexible compressible pattern from said flexible compressible gel, said flexible compressible pattern defining space in said mold;

setting said flexible compressible pattern on a liquid absorbing mold to form a composite mold;

pouring said slurry comprising ceramic particles dispersed in said liquid dispersion medium into said space;

absorbing said liquid dispersion medium of said slurry into said liquid absorbing mold of said composite mold until said slurry turns into a green body while said flexible composite pattern maintains said desired shape, said flexible compressible pattern of said composite mold absorbing caused by shrinkage of said green body during molding of said green body;

removing said flexible compressible pattern by liquefying said flexible compressible pattern; and drying said green body from which said flexible compressible pattern has been removed to form said molded object with said high level of dimensional accuracy.

9. A method of slip casting to form a molded object having a high level of dimensional accuracy, comprising the steps of:

setting a metal pattern in a mold;

pouring a solution of a flexible organic material into a cavity between said mold and said metal pattern at an elevated temperature, said solution gelling when cooled to form a flexible compressible gel and said gel becoming a liquid when heated to a temperature lower than a boiling point of a liquid dispersion medium of a slurry to be cast;

cooling said poured solution to form said flexible compressible gel, said flexible compressible gel maintaining a desired shape in said slurry to be cast, said flexible compressible gel forming a portion of a surface contacting said mold, said flexible compressible gel being adapted to absorb said liquid dispersion medium of said slurry to be cast, said flexible compressible gel being removable through pores of said molded object formed of said slurry;

removing said metal pattern from said mold to form a flexible compressible pattern, said flexible compressible pattern defining a space in said mold;

setting said flexible compressible pattern on a liquid absorbing mold to form a composite mold;

pouring said slurry comprising ceramic particles dispersed in said liquid dispersion medium into said space;

absorbing said liquid dispersion medium of said slurry into said flexible compressible pattern and said liquid absorbing mold of said composite mold until said slurry turns into a green body while said flexible compressible pattern maintains said desired shape, said flexible compressible pattern of said composite mold absorbing stresses caused by shrinkage of said green body during molding of said green body;

removing said flexible compressible pattern by liquefying said flexible compressible pattern; and drying said green body from which said flexible compressible pattern has been removed to form said molded object with said high level of dimensional accuracy;

10. A slip casting method as claimed in claim 3, wherein the method further includes the step of providing said flexible compressible gel at a portion of a surface of said mold which is in contact with said slurry and in a vicinity of a slurry inlet.

11. A slip casting method to form a molded object as claimed in one of claims 10 and 1 to 9, wherein the method further includes the step of providing said flexible compressible gel with a Young's modulus smaller than a Young's modulus of said molded object.

12. A slip casting method to form a molded object as claimed in one of claims 10, and 1 to 9, wherein the method further includes the step of providing said flexible compressible gel being soluble in water or an organic solvent or a mixture thereof.

13. A slip casting method to form a molded object as claimed in one of claims 10 and 1 to 9, wherein the method further includes the step of providing said flexible compressible gel containing bubbles.

14. A slip casting method to form a molded object as claimed in one of claims 10 and 1 to 9, wherein said gel is made from a material selected from the group consisting of gelatin, hemicellulose, polyalkylene and polyethylene glycol.

* * * * *